(12) United States Patent
Nishiyama et al.

(10) Patent No.: US 7,043,739 B2
(45) Date of Patent: May 9, 2006

(54) DISK ARRAY APPARATUS

(75) Inventors: Shinichi Nishiyama, Ninomiya (JP); Tadaharu Maeda, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 104 days.

(21) Appl. No.: 10/849,113

(22) Filed: May 20, 2004

(65) Prior Publication Data

US 2005/0195699 A1    Sep. 8, 2005

(30) Foreign Application Priority Data

Mar. 4, 2004  (JP) ............................. 2004-061111

(51) Int. Cl.
*G11B 31/00*  (2006.01)
(52) U.S. Cl. ...................... 720/600; 361/395
(58) Field of Classification Search ............... 720/600; 361/686, 687, 395; 340/693.5
See application file for complete search history.

(56) References Cited

U.S. PATENT DOCUMENTS

| | | | |
|---|---|---|---|
| 5,119,497 A | 6/1992 | Freige et al. | |
| 5,559,678 A | 9/1996 | Fukuda et al. | |
| 6,480,379 B1 * | 11/2002 | Dickey et al. | 361/687 |
| 2003/0201902 A1 * | 10/2003 | Post et al. | 340/693.5 |
| 2004/0130867 A1 * | 7/2004 | Huettner et al. | 361/687 |
| 2004/0196627 A1 * | 10/2004 | Lohman | 361/686 |

FOREIGN PATENT DOCUMENTS

JP    6-232578    8/1994

\* cited by examiner

*Primary Examiner*—Tianjie Chen
(74) *Attorney, Agent, or Firm*—Mattingly, Stanger, Malur & Brundidge, P.C.

(57) ABSTRACT

A disk array apparatus facilitating the management of dummy boards which are dismounted when logic boards are additionally installed, for example. A storage section for storing dummy boards, which are removed when logic boards are additionally installed, is provided in the disk array casing. The storage section is provided in a place where the dummy boards do not adversely affect the passages of the flow of cooling air in the disk array casing and the work of mounting or dismounting the component parts on the rear side of a platter cover for shielding the logic section where logic boards are accommodated, for example, and the dummy boards are fixed to the storage section with screws.

17 Claims, 10 Drawing Sheets

DISK ARRAY APPARATUS

INCORPORATION BY REFERENCE

The present application claims priority from Japanese application JP2004-061111 filed on Mar. 4, 2004, the content of which is hereby incorporated by reference into this application.

BACKGROUND OF THE INVENTION

The present invention relates to a disk array apparatus, which contains a plurality of disk drives for storing data, for reading and writing data by controlling the disk drives, and particularly to an extension structure for additionally installing component parts.

Generally, a disk array apparatus comprises a plurality of disk drives for storing data, a plurality of logic boards for controlling the disk drives, a fan for generating an air flow to cool the interior of the apparatus, and power supply equipment to supply electric power to the disk drives, logic boards, and the fan. All those component parts are mounted in a disk array casing.

Such a disk array apparatus is configured such that the logic boards and so on are initially mounted in the basic structure and additional parts can be added on the basic structure. In this case, dummy parts are mounted in the spaces (free slots) for additional installation to improve the cooling property and to provide dust control and short-circuit prevention. In an additional installation, the dummy parts are removed and logic boards and so on for addition are mounted.

An extension structure of circuit boards by using dummy parts has been disclosed in JP-A-06-232578, for example.

SUMMARY OF THE INVENTION

In the above-mentioned disk array apparatus, when logic boards or the like are installed additionally, the dummy parts, which were dismounted, must be carefully stored in preparation for when the installed parts are reduced in the future. More specifically, in the disk array apparatus, there are often cases where component parts, such as the logic boards, are decreased (dismounted) instead of additional installation, and in such a case, after the logic boards and so on are dismounted, it is necessary to mount the dummy parts in the free spaces that result.

Heretofore, however, the dummy parts were stored outside the disk array apparatus; therefore, problems tended to arise, such as losses of the dummy parts and mingling with other parts. If there is such a problem, when a maintenance worker removes some of the parts, such as logic boards in a customer's premises, for example, the above problem causes a great hindrance and inefficiency, making the maintenance of the dummy parts troublesome.

The present invention was made with the above problem in mind, and has as its object to provide a disk array apparatus, which facilitates maintenance of the dummy parts dismounted in an additional installation of the logic boards or the like and improves the efficiency in reducing the installed parts.

To achieve the above object, the present invention, there is provided a disk array apparatus which comprises a plurality of disk drives for storing data; a plurality of logic boards for controlling the plurality of disk drives; a fan for generating an air flow to cool the interior of the apparatus; power supply equipment for supplying electric power to the disk drives, the logic boards, and the fan, and the plurality of disk drives, the plurality of logic boards and the fan are mounted as component parts in a disk array casing, and the disk array apparatus are configured such that component parts can be added on and dummy parts are temporarily mounted in the spaces for additional installation, wherein a storage section for storing the dummy parts, which are dismounted when some component parts are added on, is provided in the disk array casing.

In this case, to store the dummy parts, a storage section should be selected in such a place which does not obstruct the flow of the cooling air and which does not affect the work of mounting or dismounting the component parts. A concrete and preferable example of the place of the storage section is on the rear side of the shielding cover plate which covers the logic section where the logic boards are accommodated.

Those dummy parts are fixed to the storage section with screws mounted at both ends thereof. The storage section is so structured as to have formed at varied intervals screw holes into which the screws engage, so that dummy parts of a plurality of sizes can be fixed. When the dummy parts are fixed to the storage section, the strength and shielding property of the cover plate is improved.

The disk array apparatus according to the present invention is free of losses of the dummy parts or mixing with other parts because the storage section for storing the dummy parts, which are dismounted when the component parts are additionally installed, is provided in the disk array casing, thus facilitating the maintenance of the dummy parts.

Therefore, when a maintenance worker decreases the component parts in a customer's premises, for example, dummy parts can be mounted securely in the spaces from which the component parts were removed, thereby improving the efficiency of the reduction of the installed component parts, and making it possible to shorten the working hours of the maintenance worker, enhance the confidence of the customer, and reduce maintenance cost.

In the disk array apparatus of this present invention, because the dummy parts are stored in the place where they do not affect the passages of cooling air flow in the disk array casing, there are no chances of aggravating the temperature environment in the disk array apparatus.

Furthermore, because the dummy parts are stored in the place where they do not adversely affect the work of mounting or dismounting the component parts in the disk array casing, there is no obstruction to the work of increasing or decreasing the component parts.

Because the dummy parts are stored in the place where they do not adversely affect the mounting or dismounting of the component parts in the disk array casing, there are no chances of inhibiting additionally installing or decreasing the component parts.

In the present invention, in the structure that the dummy parts are stored inside the shielding cover plate covering the logic section where the logic boards are accommodated, because the strength of the cover plate is improved when the dummy parts are fixed thereto, the thickness of the cover plate can be made thinner accordingly, which makes it possible to reduce the cost of the cover plate and decrease the weight of the whole apparatus.

Furthermore, because when the dummy parts are fixed to the cover plate, the shielding property of the cover plate can be improved, and the cover plate effectively conforms to the additional installation of the logic boards. In other words, as the logic boards are increased in number, the high-frequency noise increases, but in proportion to the increase in the logic boards, the number of the dummy parts fixed to the cover plate increases, thereby increasing the shielding effectiveness, making it possible to securely suppress the leakage of the high-frequency noise.

Other objects, features and advantages of the invention will become apparent from the following description of the embodiments of the invention taken in conjunction with the accompanying drawings.

DESCRIPTION OF THE EMBODIMENTS

Embodiments will be described with reference to the accompanying drawings.

Figure 1:
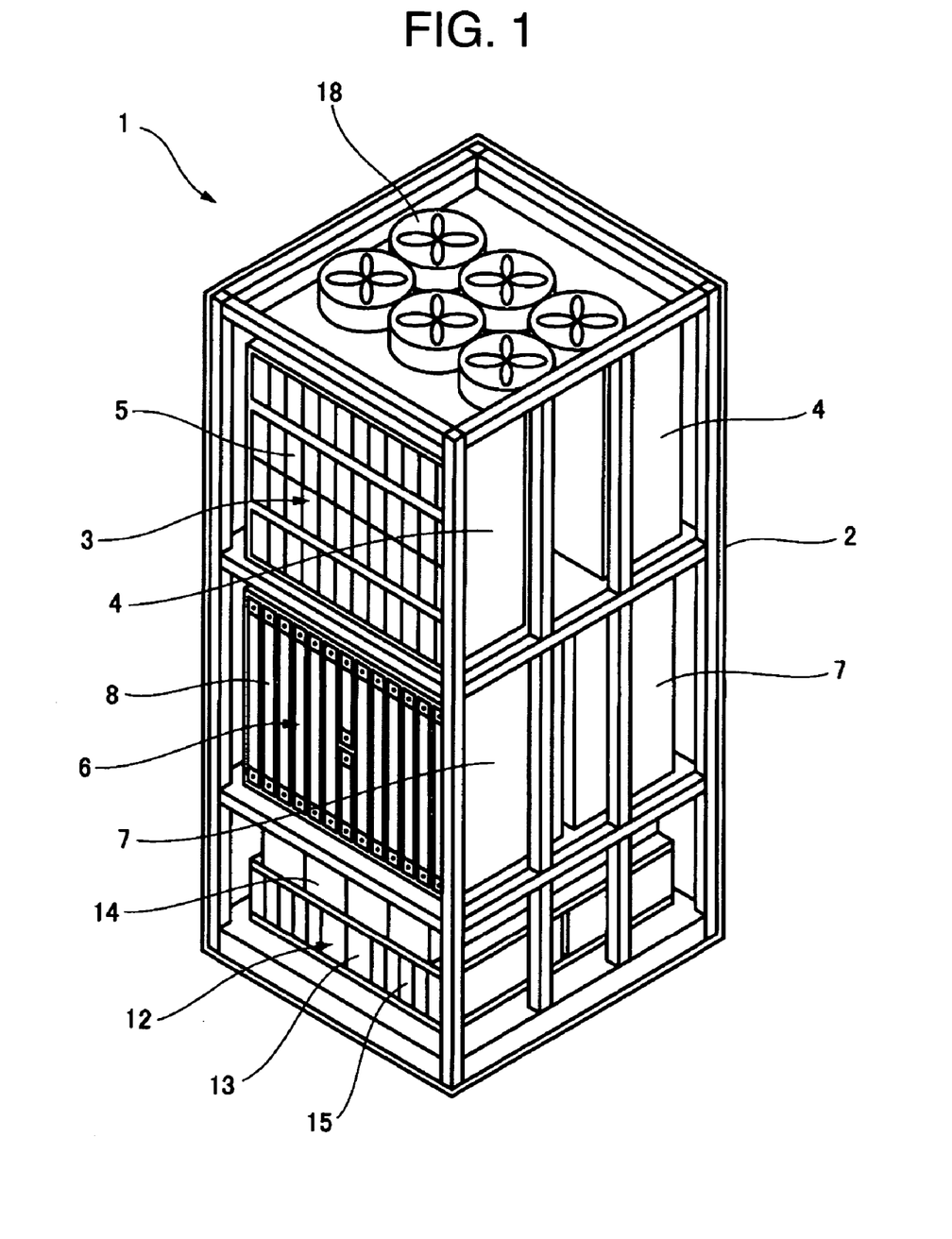
FIG. 1 is a perspective view showing an overall structure of a disk array apparatus according to the present invention.
Figure 2:
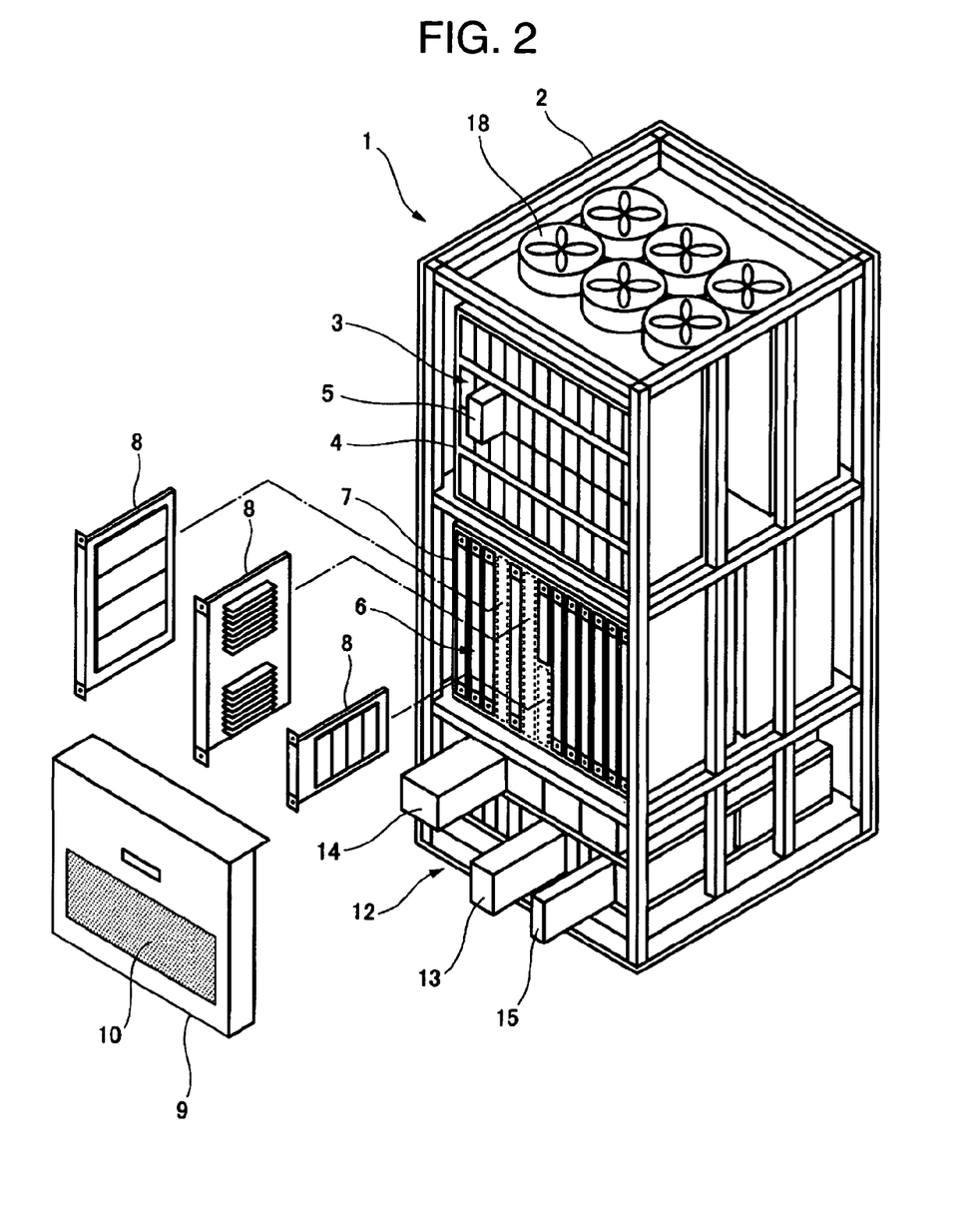
FIG. 2 is a perspective view showing the composition of component parts of the display array apparatus according to the present invention.
Figure 3:
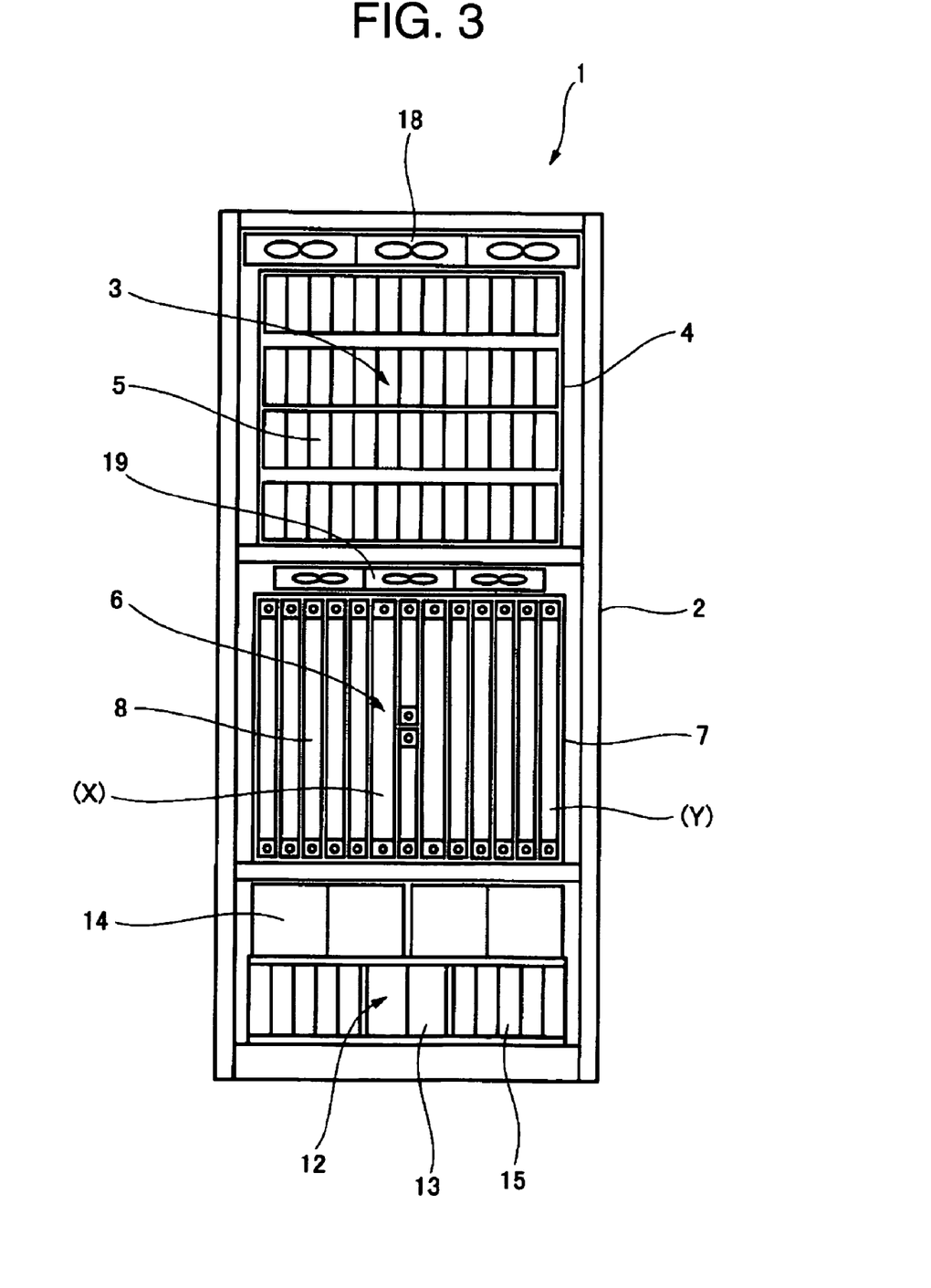
FIG. 3 is a front view of the display array apparatus according to the present invention.
Figure 4:
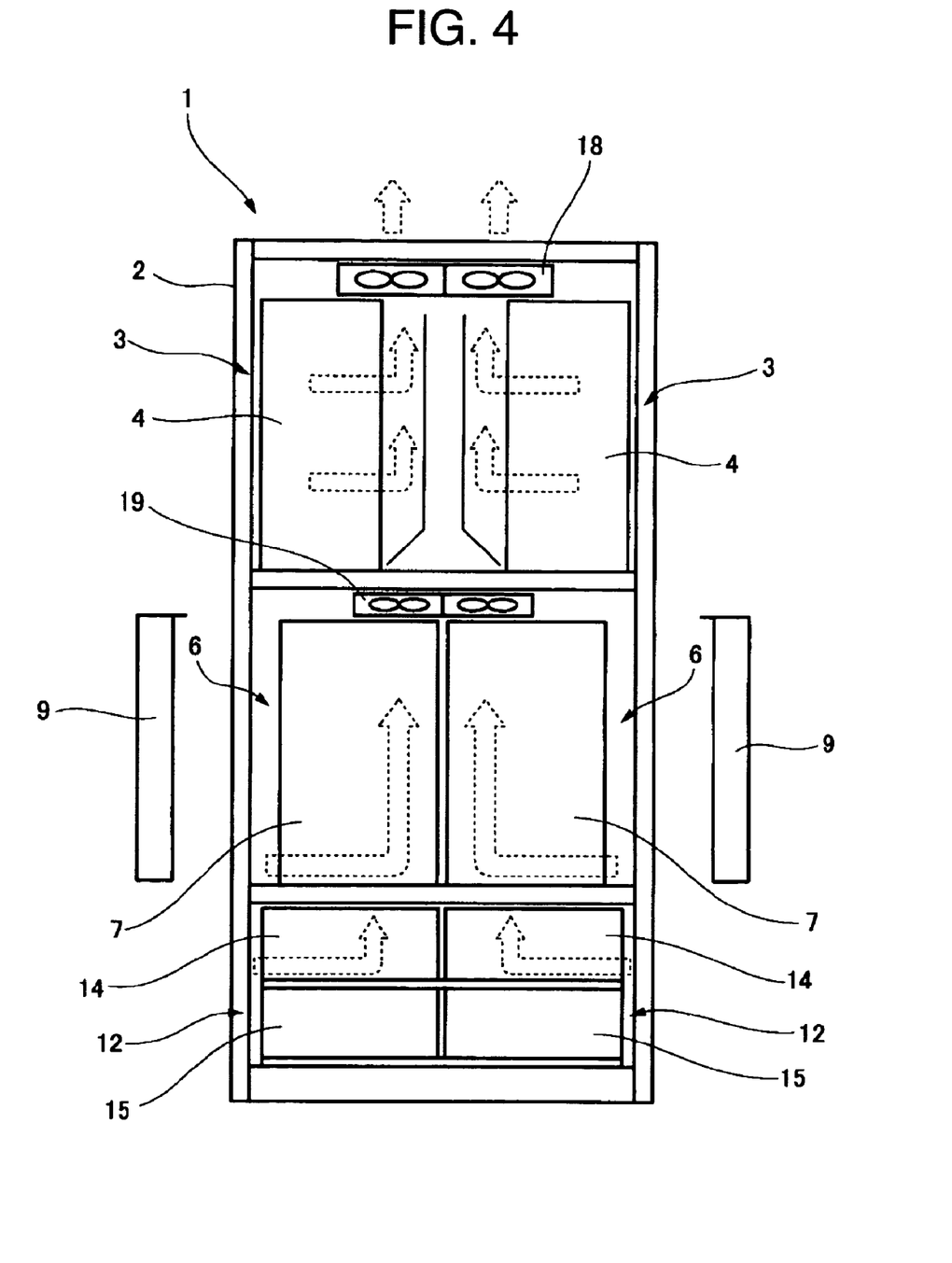
FIG. 4 is a side view of the display array apparatus according to the present invention.

To begin with, the basic structure of the disk array apparatus according to the present invention will be described with reference to FIGS. 1 to 4. FIG. 1 is a perspective view of the general structure of the disk array apparatus. FIG. 2 is a perspective view of the composition of component parts of the disk array apparatus. FIG. 3 is a front view and FIG. 4 is a side view of the disk array apparatus.

The disk array apparatus 1 includes a disk unit section 3 and a logic section 6, which are both contained in a disk array casing 2.

The disk unit section 3 has a plurality of disk drives 5 for storing data accommodated in a disk drive module 4 located in a top tier of the disk array casing. The disk drives 5 in upright position are arranged in large quantity in each horizontal row. And, those horizontal rows of disk drives are stacked in a plurality of tiers, and predetermined gaps are provided between the disk drives 5 to provide passages for cooling air flowing in the disk drive casing 4.

The logic section 6 includes a plurality of logic boards 8 for controlling the disk drives 5, and the logic boards 8 are accommodated in a logic section module 7 located in the middle tier of the disk array casing 2 below the disk unit section 3. The logic boards 8 in upright position are arranged in a horizontal direction. In the logic section module 7 where the logic boards 8 are accommodated, open ports are formed in the bottom face and the top face thereof to provide passages for cooling air flowing in the interior thereof.

There are a plurality of logic boards, including a channel adapter board for receiving data from a host computer, a disk adapter board for controlling reading or writing data to the plurality of disk drives, a memory board for storing data and control information written to or read from the channel adapter board and the disk adapter board. The logic boards are combined and loaded in the logic section module 7.

In the logic section 6, as means to prevent leakage of high-frequency noise generated from the logic boards 8, a platter cover 9, which covers the logic section 6, is attached to the logic section module 7. An open port 10 for introducing cooling air, which flows in the logic section module 7, is formed in the platter cover 9.

In the disk array apparatus 1, power supply equipment 12 is disposed in the bottom tier (below the logic section 6) of the disk array casing 2.

The power supply equipment 12 comprises an AC power unit 13, a DC power unit 14 and a battery unit 15. Electric power from the universal AC power supply is supplied, and as the power is passed through an AC power unit 13 and a DC power unit 14, it is converted into a predetermined amount of power, which is supplied to the disk drives 5 and the logic boards 8. In time of power outage, the battery unit 15 supplies a backup power to the disk drives 5 and the logic boards 8.

In the disk array apparatus 1, the disk unit section 3, the logic section 6, and the power supply equipment 12 are provided each divided symmetrically into the front section and the rear section. The disk array casing 2 is open at the front side and the rear side, and from those open sides, the disk drives 5, the logic boards 8, and the power supply equipment 12 can be mounted or dismounted.

In the disk array apparatus 1, fans 18 and 19 are provided at the top surface of the disk array casing 2 and above the logic section module 7 in the disk array casing 2.

The fans 18 and 19 are driven by power supplied from the power supply equipment 12 to cool the interior of the disk array equipment 1. More specifically, when the fans 18 and 19 are driven, as shown by dot-line arrows in FIG. 4, the air drawn in from the disk unit section 3 passes through the disk drive unit module 4 and flows upward, the air drawn in from the logic section 6 passes through the logic section module 7 and flows upward, and also the air taken in from the power supply equipment 12 flows upward. Those air flows serve to effectively cool the interior of the disk array casing 2, and eventually discharged by the fans 18 to the outside.

Figure 5:
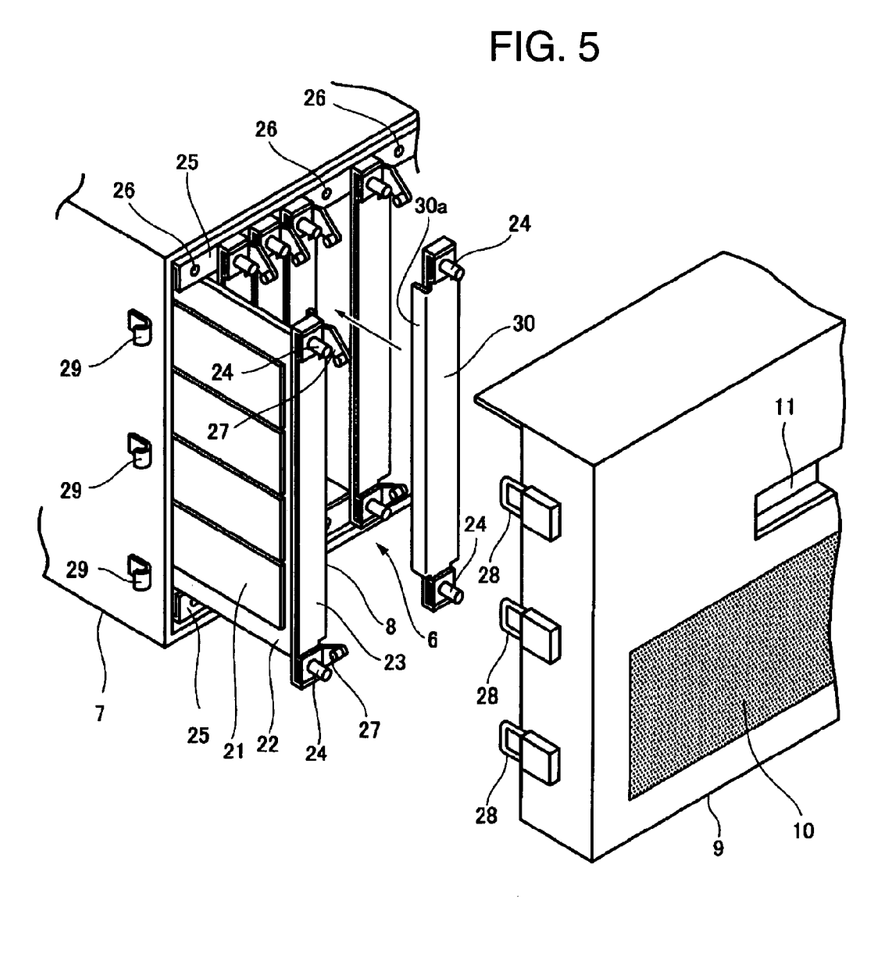
FIG. 5 is a perspective view of a logic section showing a preferred embodiment of the present invention.

Then, description will be made of the structure of the logic section 6 according to a preferred embodiment of the present invention with reference to FIG. 5.

Each of the logic boards 8, which constitute the logic section 6, comprises a board proper 22, on which electronic circuit parts 21 are mounted, and a fixing plate 23 fixed to the board proper 22. Two screws 24 are mounted respectively one to each end of the fixing plate 23. According to this arrangement, screw holes 26 are formed in the guide channels 25 at upper and lower ends of the logic section module 7.

When mounting a logic board 8 to the logic section 6, the board proper 22 is inserted into the logic board module 7, and under this condition, the screws 24 are inserted into the screw holes 26 of the guide channels 25 and fixed. When removing the logic board 8, the screws 24 are removed from the screw holes 26, and by operating the levers 27 at each end of the fixing plate 23, the board proper 22 is dismounted from the logic section module 7.

In the logic section, since high-frequency noises are generated from the logic boards 8, as means to prevent leakage of the high-frequency noises, the platter cover 9 for shielding purposes is attached to the logic section module 7. Like in the logic section module 7, the platter cover 9 is formed of iron, and mounted to the logic section module 7 in a manner to cover the logic section 6. In the platter cover 9, there are provided an open port 10 for introducing air that is to flow in the logic section module 7 and also a pit 11 to put fingers on when holding the platter cover 9. Note that the open port 10 is provided by forming numerous small holes in the platter cover 9.

The platter cover 9 is fixed to the logic section module 7 in a manner to tightly cover the logic section 6 by engaging the fixing clasps 28, provided on each side of the platter cover 9, to the hooks 29 attached to each side of the logic section module 7.

In the logic section 6, the logic boards 8 are initially mounted in the basic structure, and additional logic boards can be added on later. In this case, dummy boards 30 are originally mounted to provide better cooling property, dust control and short-circuit prevention in the space for additional installation, and in an additional installation, those dummy boards 30 are removed and logic boards for additional installation are mounted.

Figure 6:
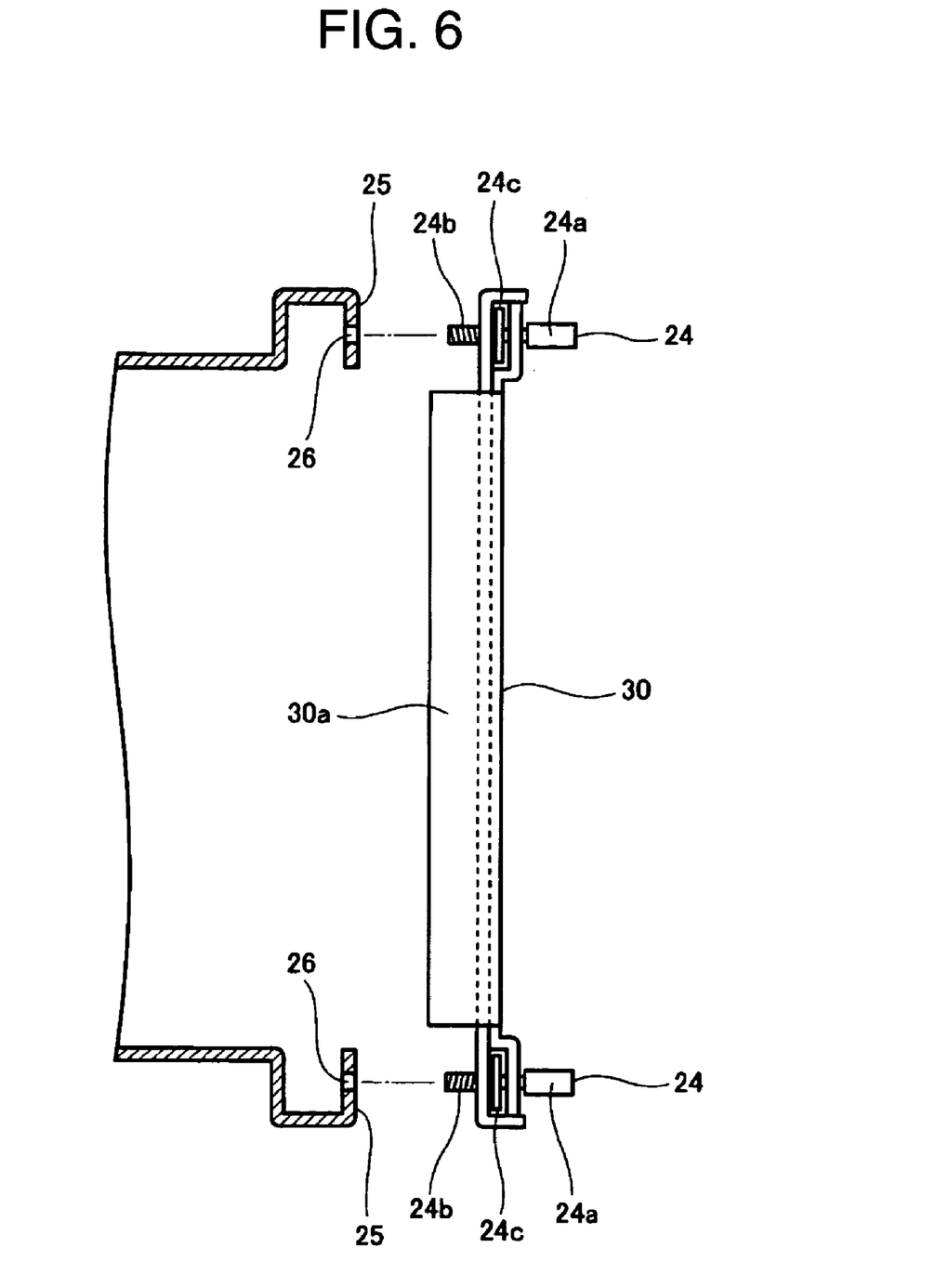
FIG. 6 is a side view of a dummy board according to the present invention.

The dummy board 30 is made in the same structure as the fixing plate 23, and is fixed to the upper and lower guide channels 25 of the logic section module 7 by the screws 24 mounted to each end of the dummy board 30. As shown in FIG. 6, the screws 24 are mounted under the condition they are prevented from coming off by washers 24c which are engaged with the hollow portion of the dummy board, and those screws 24 are fixed by rotating the finger grips 24 to engage distal-end threaded parts 24b to the screw holes 26 of the guide channels 25.

Being made of iron, the dummy board 30 has sufficient strength, and in addition, the bending strength of the dummy board is strengthened by forming ribs 30a along side-end portions of the dummy board. Those ribs 30a are formed by forming extensions along the side ends of the dummy board 30 and by bending the extensions at a right angle to the main body of the dummy board.

The dummy boards 30 are removed when logic boards 8 are additionally installed. The dummy boards which have been removed need to be stored carefully in preparation for when the logic boards 8 are decreased. In other words, with this disk array apparatus, there are often cases where the logic boards 8 are decreased, in such a case, after the logic boards 8 are removed, the dummy boards 30 need to be mounted in the resulting free spaces.

With the disk array apparatus according to the present invention, the storage section 31 for storing the dummy boards 30 is provided in the disk array casing 2. In this case, the storage section 31 is provided in a place that circumvents the areas required for the passage of cooling air flow and the area required for mounting or dismounting the component parts.

Figure 7:
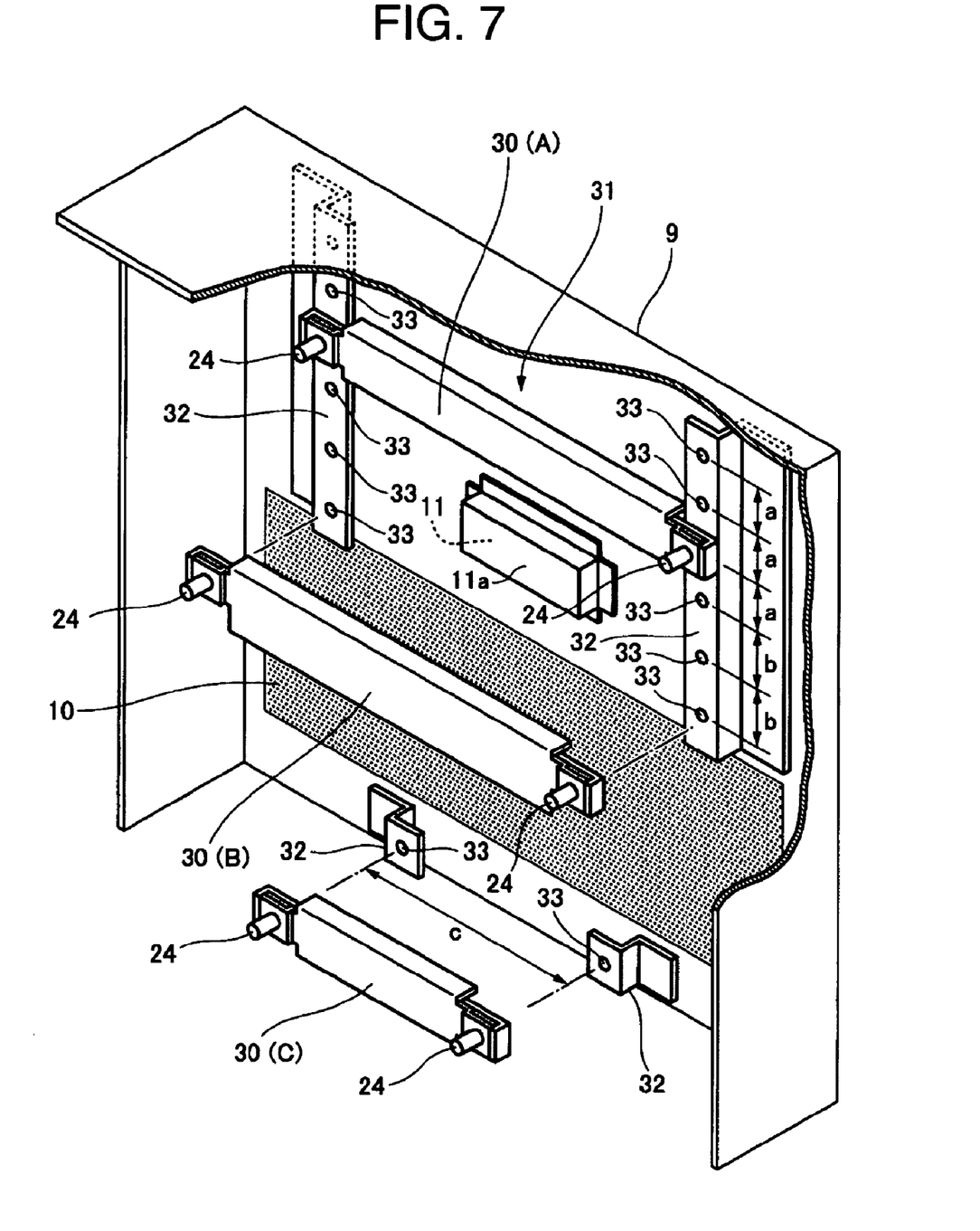
FIG. 7 is a perspective view, with portions broken away for clarity, taken from the rear side of a shielding platter cover mounted on a logic section.

In this example as a preferable embodiment, as shown in FIG. 7, the storage section 31 for storing the dummy boards 30 is provided inside the shielding platter cover 9, which is mounted to the logic section 6.

In this case, a pair of fixing brackets 32, one each to the left and right, is welded to the positions that circumvent the open port 10 for air suction on the rear side of the platter cover 9. The fixing brackets 32 are so formed that a plurality of dummy boards 30 can be fixed to the fixing brackets 32. In other words, in the fixing brackets 32, like in the guide channels 25 of the logic section module 7, the screw holes 33 are formed in the fixing brackets 32, and by engaging the screws 24 of the dummy boards 30 into those screw holes 33, the dummy boards 30 are fixed.

Among the dummy boards 30, there are three kinds of dummy board to correspond to the kinds of the logic boards 8: those of standard size classified as type A, those of wide width classified as type B, and those of short length classified as type C.

Accordingly, the storage section 31 is structured so that screw holes, into which the screws engage, are formed at varied intervals. For this reason, by using the screw holes of varied intervals to suit different sizes of the above-mentioned three kinds of dummy boards 30, it is possible to securely fix the dummy parts of different sizes. In other words, in this example, two or more dummy boards 30 of type A and type B can be fixed to the fixing brackets 32 in vertical direction above the open port 10. In this example, the distances in the vertical direction between the screw holes 33 formed in the fixing brackets 32 are varied to suit the sizes of dummy boards type A and type B. On the other hand, the dummy board type C 30 is structured so that one piece of type C can be fixed to the fixing bracket 32 below the open port 10 and that the space between the left and right screw holes 33 of the fixing bracket 32 is set as C to suit the size of type C. Therefore, it is possible to readily fix three kinds of dummy boards 30 of different sizes.

A back plate 11a used to form the pit 11 to put fingers on is fixed to the rear side of the platter cover 9 where the storage section 31 is provided. In the storage section 31, the positions where the dummy boards 30 are fixed are selected so that the ribs 30a of the dummy boards 30 do not contact the back plate 11a.

Figure 8:
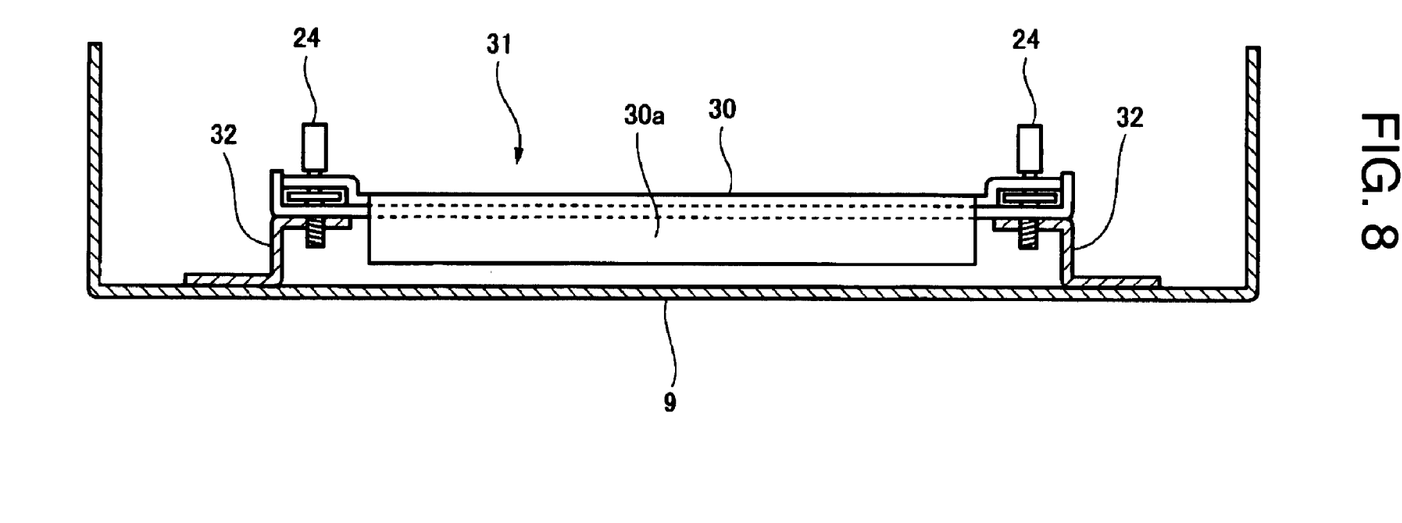
FIG. 8 is a transverse cross section of the platter cover to which the dummy board is fixed.

The platter cover 9 where the dummy board 30 is fixed is in a condition that it has been reinforced with the dummy board 30 as shown in FIG. 8, so that its strength has been improved. Particularly in this example, because the dummy board 30 is fixed to the platter cover 9 with screws 24, the platter cover 9 is integrated securely with the dummy board 30, and moreover as the ribs 30a are formed on the dummy board 30, the strength of the platter cover 9 is further increased. As a result of the dummy board 30 being fixed to the platter cover 9, the shielding property of the platter cover 9 is improved against high-frequency noises generated from the logic boards 8.

As has been described, in the disk array apparatus in this example, because the storage section 31, which stores the dummy boards 30 dismounted when additionally installing logic boards 8, is provided on the rear side of the platter cover 9 in the disk array casing 2, it is easy to manage the dummy boards 30, thus eliminating the occurrence of losses of the dummy boards and their mingling with other parts.

Therefore, for example, when a maintenance worker reduces the logic boards in a customer's premises, the dummy boards 30 can be mounted on the spot securely in the spaces from which the logic boards 8 were removed, making it possible to carry out the reduction work efficiently. As a result, the working hours of the maintenance worker can be shortened, the confidence of the customer can be improved, and maintenance cost can be decreased.

Furthermore, in the disk array apparatus in this example, because the dummy boards 30 are stored in such a position as to circumvent the air-suction open port 10 in the platter cover 9, there are no adverse effects on the passages of cooling air in the interior of the disk array casing and therefore the temperature environment is prevented from aggravating in the disk array apparatus.

To corroborate the effectiveness of the above-mentioned temperature environment preservation, the present inventors conducted an experiment as follows.

More specifically, the temperature in the disk array apparatus was measured when a dummy board 30 was fixed in a position off the air-suction open port 10 for in the platter cover 9 as in the above embodiment (first measuring condition) and when a dummy board 30 was fixed in a position to obstruct the open port 10 of the platter cover 9 (second measuring condition), and then measured temperatures were compared. The temperature measuring points were two in the logic section module 7: on the main body (point X) of the logic board in the center (X) of the logic section 6 and on the main body (point Y) of the logic board at the rightmost position (Y).

The measurement results are shown in Table 1.

TABLE 1

| Measuring Point | First Measuring Condition | Second Measuring Condition |
|---|---|---|
| X | 46.4° C. | 48.6° C. |
| Y | 48.2° C. | 50.9° C. |

From the measurement results, when a dummy board 30 was fixed in a position to obstruct the open port 10 of the platter cover 9 (second measuring condition), the flow of cooling air was obstructed, thus raising the temperature at each measuring point. In contrast, when a dummy board 30 was fixed in a position to circumvent the air-suction open port 10 in the platter cover 9 (first measuring condition) as it was in this example, obviously the temperature was held down, thereby preventing the temperature environment in the disk array apparatus from deteriorating.

Further, in the disk array apparatus of this example, because the dummy boards 30 are stored on the rear side of the platter cover 9, the platter cover 9 (as well as the dummy boards) is invariably dismounted when additionally installing or decreasing logic boards 8, the dummy boards do not interfere with mounting or dismounting the logic boards 8, nor do they adversely affect installing or removing other component parts, such as the disk drives 5 or the power supply equipment.

Further, in the disk array apparatus of this example, because when the dummy boards 30 are fixed to the platter cover 9, the strength of the platter cover 9 improves; therefore, the platter cover 9 is free of warping and is capable of securely and tightly closing the logic section 6. The platter cover 9, as its strength is improved by fixing the dummy boards 30, can be reduced in thickness accordingly, making it possible to reduce the cost of the platter cover 9 and decrease the total weight of the disk array apparatus.

Moreover, as the shielding property of the platter cover 9 is improved when the dummy boards 30 are fixed, the platter cover 9 effectively conforms to an additional installation of logic boards 8. As the logic boards 8 are added on, the high-frequency noises increase, but in proportion to the increase in the logic boards, the number of the dummy boards 30 fixed to the platter cover 9 increases, thus increasing the shielding effectiveness, with the result that it becomes possible to securely reduce the leakage of the high-frequency noises.

Figure 9:
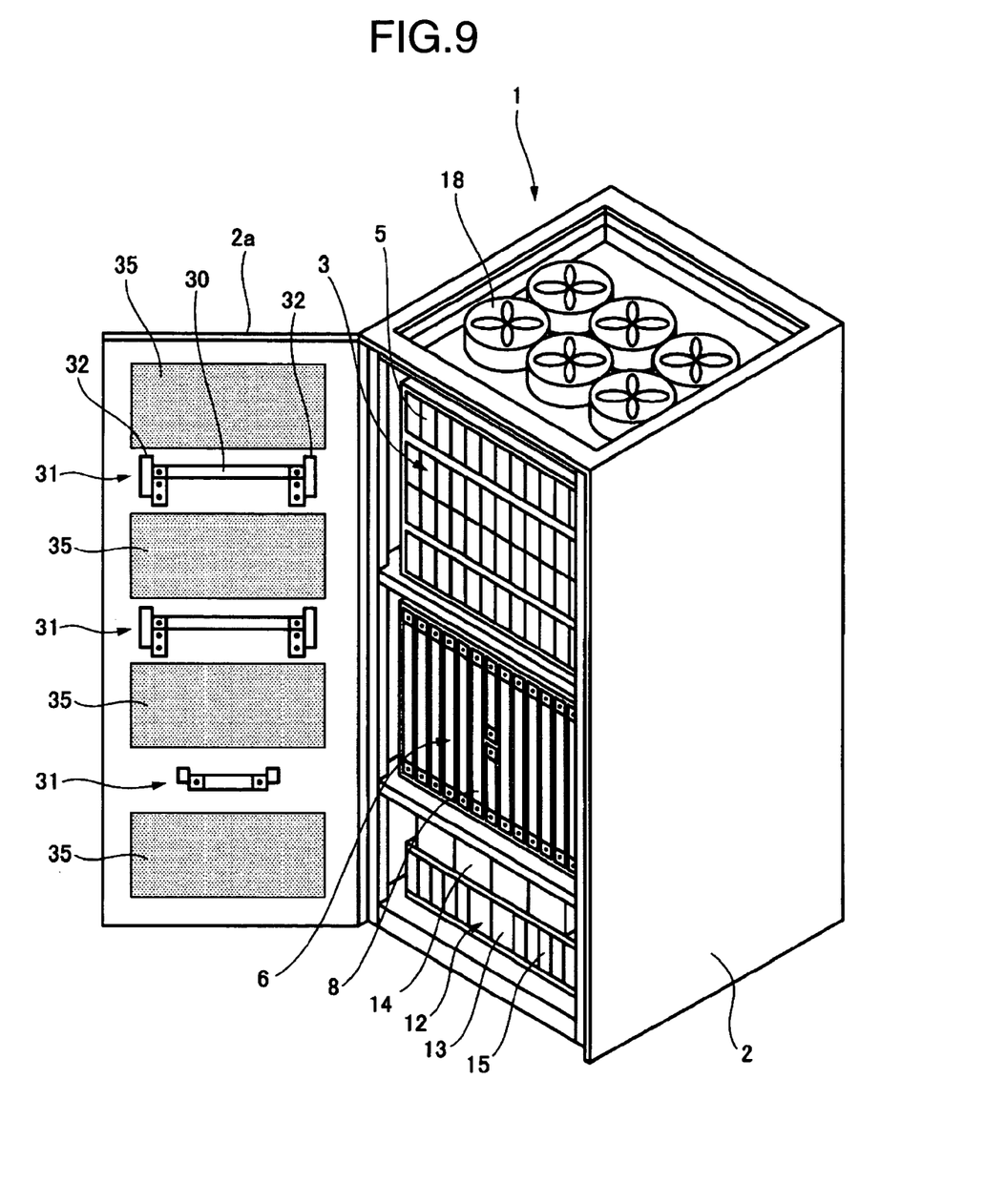
FIG. 9 is a perspective view of the display array apparatus according to another embodiment of the present invention.

FIG. 9 shows another embodiment of the present invention. This embodiment is of a structure that the storage section 31 for storing the dummy boards is provided at the door 2a that opens and closes the disk array casing 2. More specifically, the disk array apparatus of this embodiment is fitted with two side-opening doors 2a, respectively one each to the front and the rear opening sides of the disk array casing 2. The structure of the storage section 31 for the door 2a is the same as in the above-mentioned platter cover 9, in other words, a dummy board 30 is fixed by screws to a pair of the left and the right fixing brackets 32 welded to the door 2a.

A plurality of open ports 35 for introducing cooling air that is to flow in the disk array casing 2 are formed in the door 2a. Each storage section 31 is provided in a portion between the open ports 35, to fix a dummy board 30. As the dummy boards 30 are fixed in the positions to circumvent the open ports 35, the dummy boards 30 never affect the flow of the cooling air. As the dummy boards 30 are stored on the rear side of the door 2a, they are not in the way of mounting or dismounting of the logic boards 8 and other component parts.

In this example, above all else, when the door 2a of the disk array apparatus is opened, the stored dummy boards 30 immediately come in sight and are easy to confirm. In additionally installing or decreasing the logic boards 8, when the door 2a is opened, the storage section 31 comes to just the side of a maintenance worker, he can smoothly mount or dismount the dummy boards 30, which is an advantage of very good workability.

Figure 10:
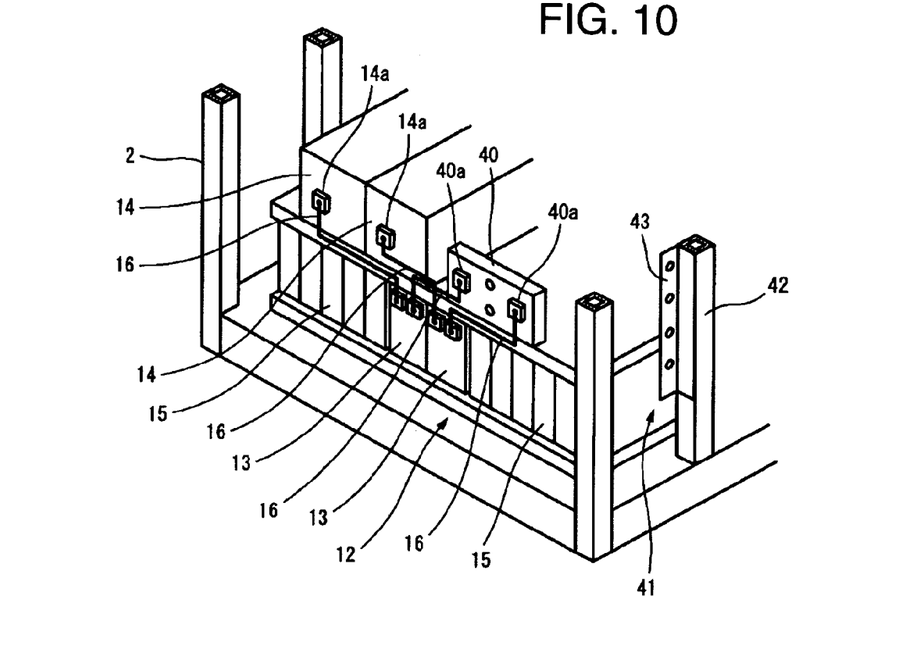
FIG. 10 is a perspective view of power supply equipment according to an additional embodiment of the present invention before extension of the power supply.
Figure 11:
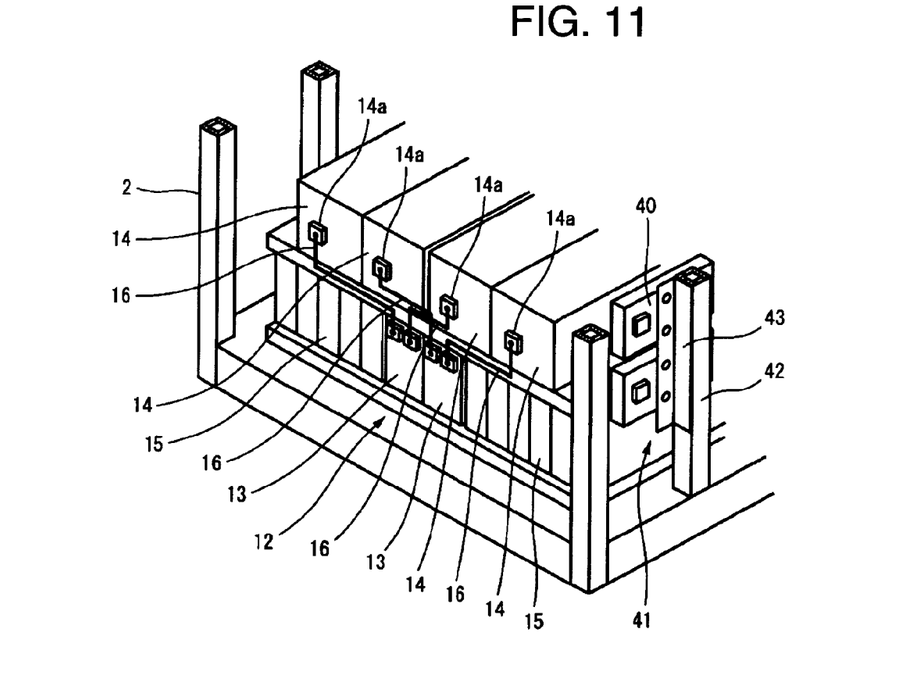
FIG. 11 is a perspective view of power supply equipment according to the additional embodiment of the present invention after extension of the power supply.

FIGS. 10 and 11 show yet another embodiment of the present invention.

This example shows an embodiment of the power supply equipment 12 of the disk array apparatus, and as shown in FIG. 10, two DC power units 14 are provided in the basic structure and by the side of them, there remains a space where two more DC power units can be additionally installed. Note that the DC power units are to be added or decreased in a set of two units. (In the illustration, only power supply equipment on the front side are shown, but there is also power supply equipment to be mounted on the rear side.)

In this power supply equipment, cables 16 for electric power supplied from an AC power unit 13 are connected to terminals 14a of the DC power units 14. In the state before the additional installation of DC power units, to prevent short-circuit of cables 16 connected to DC power units which are added on, a dummy plate 40 is mounted in the addition space for DC power units as shown in FIG. 10, and those free cables are connected to dummy terminals 40a on the dummy plate 40.

When DC power units 14 are added, the dummy plate 40 is removed and cables 16 are connected to the terminals 40a of the added DC power units 40 as shown in FIG. 11.

In the disk array apparatus of this example, a storage section 41 for storing the dummy plate 40 dismounted when the DC power units are added on one side of the disk array casing 2.

The storage section 41 is formed in the disk array casing 2 by attaching a fixing plate 43 to a side column 42 near the addition space for DC power units 14, and when DC power units 14 are added, the dummy plates 40 are fixed with screws in a manner to be parallel with the inner wall of the disk array casing 2 as shown in FIG. 11.

When the dummy plates are stored in parallel with the side wall of the disk array casing 2 as illustrated, the dummy plates 40 never adversely affect the flow of the cooling air in the disk array casing 2. As the dummy plates are stored along the side wall of the disk array casing 2, they are not in the way of mounting or dismounting the power supply equipment and other component parts.

In this power supply equipment, above all else, because the DC power units 14 are large and the addition space for them is wide, a sufficient working area can be secured for mounting or dismounting the dummy plates 40, thus providing an advantage of smooth work with better workability.

The embodiments of the present invention have been described, but the present invention is not limited to those embodiments. In the embodiments, examples have been shown in which the present invention is applied to the logic section and the power supply equipment of the disk array apparatus, but the present invention can be applied also to the disk unit section.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk array apparatus comprising:
   a plurality of disk drives for storing data;
   a plurality of logic boards for controlling the plurality of disk drives;
   a fan for generating a air flow to cool an interior of the apparatus;
   power supply equipment for supplying electric power to the disk drives, the logic boards, and the fan,
   the plurality of disk drives, the plurality of logic boards and the fan being mounted as component parts in a disk array casing, and the disk array apparatus being configured such that component parts can be added on in future and dummy parts are temporarily mounted in spaces for additional installation,
   wherein a storage section for storing the dummy parts, when dummy parts are dismounted and component parts are added on, is provided for storing the dismounted dummy parts in such a place inside the disk array casing as to circumvent passages of cooling air flow and areas through which the component parts are mounted or dismounted.

2. The disk array apparatus according to claim 1, wherein the storage section is provided at a shielding cover plate covering a logic section which accommodates the logic boards.

3. The disk array apparatus according to claim 2, wherein the dummy parts are fixed to the storage section with screws.

4. The disk array apparatus according to claim 3, wherein the dummy parts are so structured as to have the screws mounted to both ends thereof under a condition that the screws are prevented from coming off.

5. The disk array apparatus according to claim 2, wherein strength of the cover plate is improved by fixing the dummy parts to the storage section.

6. The disk array apparatus according to claim 2, wherein a shielding property of the cover plate is improved by fixing the dummy parts to the storage section.

7. The disk array apparatus according to claim 1, wherein the storage section is provided on a rear side of a door which opens and closes the disk array casing.

8. The disk array apparatus according to claim 7, wherein the dummy parts are fixed to the storage section with screws.

9. The disk array apparatus according to claim 8, wherein the dummy parts are so structured as to have the screws mounted to both ends thereof under a condition that the screws are prevented from coming off.

10. The disk array apparatus according to claim 1, wherein the storage section is provided along a side face of the disk array casing.

11. The disk array apparatus according to claim 10, wherein the dummy parts are fixed to the storage section with screws.

12. The disk array apparatus according to claim 11, wherein the dummy parts are so structured as to have the screws mounted to both ends thereof under a condition that the screws are prevented from coming off.

13. The disk array apparatus according to claim 1, wherein the dummy parts are fixed to the storage section with screws.

14. The disk array apparatus according to claim 13, wherein the dummy parts are so structured as to have the screws mounted to both ends thereof under a condition that the screws are prevented from coming off.

15. The disk array apparatus according to claim 13, wherein the storage section is so structured as to have screw holes, into which the screws engage, arranged at varied intervals so that a plurality of sizes of dummy parts can be fixed.

16. The disk array apparatus according to claim 1, wherein the dummy parts are formed with ribs by bending a portion thereof.

17. A disk array apparatus comprising:
   a plurality of disk drives for storing data;
   a plurality of logic boards for controlling the plurality of disk drives;
   a fan for generating a air flow to cool an interior of the apparatus;
   power supply equipment for supplying electric power to the disk drives, the logic boards, and the fan,
   the plurality of disk drives, the plurality of logic boards and the fan being mounted as component parts in a disk array casing, and the disk array apparatus being configured such that component parts can be added on in future and dummy parts are temporarily mounted in spaces for additional installation,
   wherein:
   a storage section for storing the dummy parts, when dummy parts are dismounted and component parts are added on, is provided for storing the dismounted dummy parts in such a place inside the disk array casing as to circumvent passages of cooling air flow and areas through which the component parts are mounted or dismounted,
   the dummy parts are fixed to the storage section with screws,
   the dummy parts are so structured as to have the screws mounted to both ends thereof under a condition that the screws are prevented from coming off, and
   the storage section is so structured as to have screw holes, into which the screws engage, arranged at varied intervals so that a plurality of sizes of dummy parts can be fixed.

* * * * *